Patented June 4, 1935

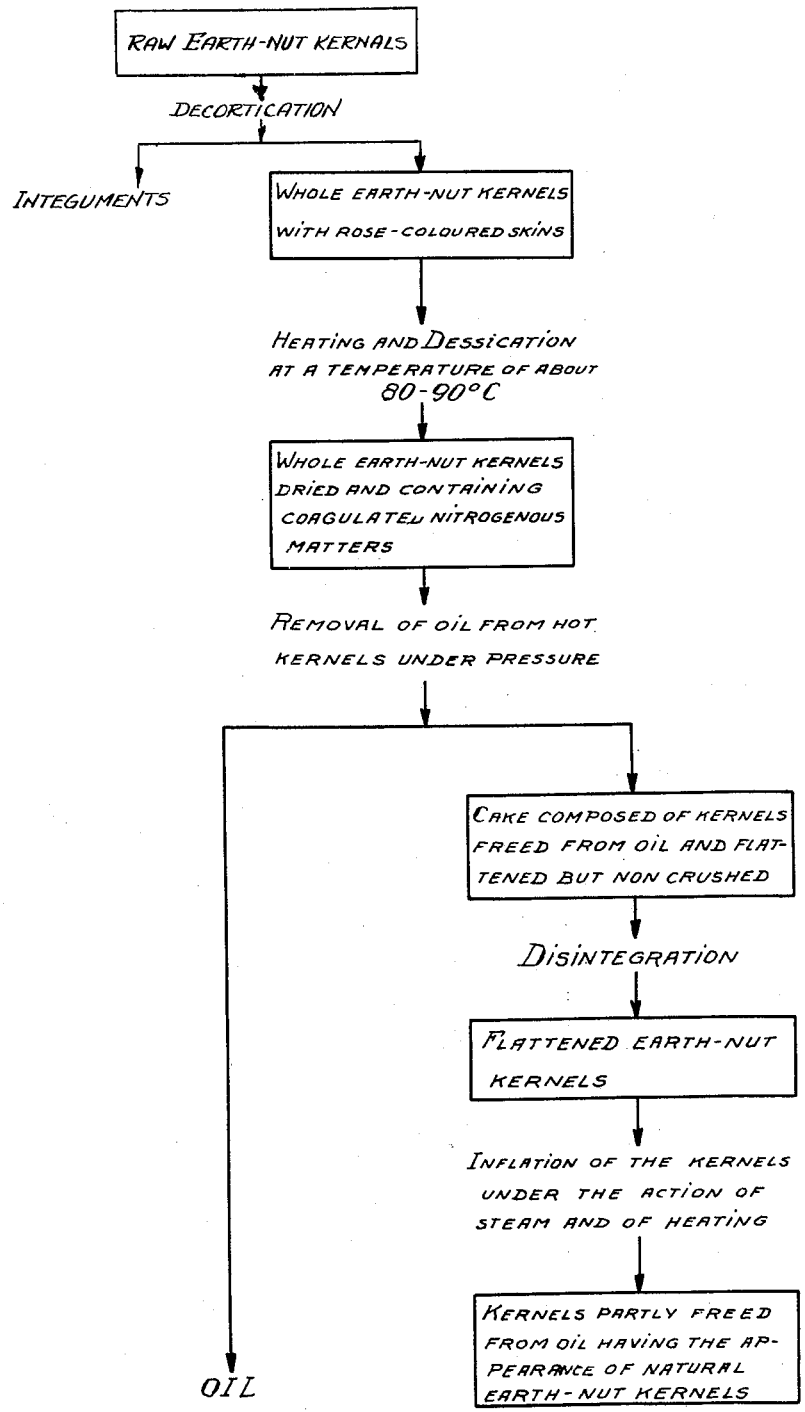

2,003,415

UNITED STATES PATENT OFFICE 2,003,415

PROCESS OF TREATING EARTH-NUT KERNELS

Paul Ammann, Paris, France

Application October 14, 1933, Serial No. 693,646
In France October 21, 1932

6 Claims. (Cl. 99—11)

In order to extract the oil contained in earth-nut kernels, it is customary to proceed to the grinding of the decorticated kernels and to subject the paste thus obtained to the action of hydraulic presses (or continuous presses). A first pressing is given in the cold which allows of obtaining a considerable part of the oil contained in the kernels. The cake thus formed still contains a certain quantity of oil; it is ground, heated and submitted again to the action of the presses. There is then obtained the second-press oil of quality inferior to that of the first press. The cake obtained, after the extraction of the oil at the second press, is utilized for the feeding of cattle (or sometimes as fertilizer for agriculture).

The process according to the present invention allows, while extracting a large part of the oil contained in the earth-nut kernels, of obtaining a by-product similar in appearance and shape to the natural earth-nut kernels, very rich in nitrogenous substances, and constituting an excellent food for man.

According to this process, the operation is carried out in the following manner: (See appended diagram.)

The earth-nut kernels are decorticated while keeping them as far as possible whole with their rose-coloured skin.

The kernels are then heated to the vicinity of 80–90°.

The heating has for its object to coagulate the nitrogenous substances, to kill the diastases of the kernel while respecting the vitamines, and to facilitate the running of the oil. The oil contained in the kernel-cells (not opened because the kernel is kept intact) is not destroyed by this heating.

If one is content to heat the kernels to a temperature lower than 80–90°, say for instance to the vicinity of 60–65°, the nitrogenous substances not being coagulated, the extraction of the oil is effected much less well.

The earth-nut kernels always contain a certain amount of moisture. In order to obtain the desired result according to the present invention, it is necessary to eliminate this moisture, at least partly, by subjecting the earth-nut kernels to a desiccating treatment.

The mere heating of the kernels already produces a partial desiccation, which contributes to facilitate the running of the oil at the moment of the pressure, but a better result is obtained when using a more intense desiccation, so as to leave in the kernels a low content of water (preferably from 4 to 1 per cent).

This more intense desiccation, while contributing largely to facilitate the running of the oil, has the following particular advantages:

1. It reduces to a minimum any appreciable squirting of the kernels through the orifices of the cage during the extraction of the oil, even with rather high pressures on these kernels (350 kgs. per sq. cm. for instance).

2. It permits of obtaining, once the pressing is terminated, a special cake (consisting of highly compressed and flattened but unground kernels) which can be very easily disintegrated.

For this heating-drying, which may take place in the air or in an inert gas (nitrogen, carbon dioxide, etc.) or even in vacuo, there can be utilized convenient suitable apparatus, for example: ordinary stoves heated by any means whatever (without the kernels being in contact with the combustion gases); or preferably apparatus such as dryers, desiccators, etc., allowing of obtaining more quickly a suitable desiccation of the kernels at the same time as the heating.

The kernels, entire and hot, are immediately subjected to the action of an oil-works press of cage type (perforated or bar-provided cage); the dimension of the orifices (holes or slots) of this cage may be, owing to the preparation of the kernels according to the process, substantially greater than that utilized habitually in oil-works; the diameter of the holes in particular being able to be not less than two or three millimeters without there being appreciable squirting as above stated.

This operation is of a duration from half an hour to one hour approximately, according to the pressure exerted which can attain 250 to 350 kgs. and more per sq. cm. It must be noted that the pressing could be done upon the unheated kernels, but the extracting of the oil would be much slower and more difficult.

There is obtained in one pressing all the oil which it is desired to extract, and consequently there is only a single quality of oil which is equivalent to the oil of first pressing obtained habitually in the oil works.

For example: with a pressure of 350 kgs. per sq. cm. approximately and a duration of from three quarters of an hour to one hour, one may obtain, according to the kind of earth-nut kernels that is treated, from 60 to 70% approximately of the oil contained in these kernels.

The pressing being terminated, there is recovered the special cake obtained, of which the elements (flattened but unground kernels the skins of which are no longer adhesive) disintegrate very easily of themselves or in the hand. After this disintegration, the material is passed over a sieve in order to separate the débris of kernels. At the same time, this sifting finishes detaching the rose-coloured skins, which are subsequently removed by a fan.

The earth-nut kernels which are then obtained are flattened but the cells are still in place and not torn open.

The kernels thus prepared are then submitted to the action of steam at about 100° for twenty to thirty minutes approximately with the object of giving the cells a certain moistness. The apparatus utilized for this operation may be constituted essentially by a boiler upon which is placed, as cover, a vessel of which the bottom is formed by a perforated sheet of metal or a metallic cloth. The steam produced in the boiler rises directly into the upper vessel and passes through the mass of kernels which have been placed there. These kernels absorb moisture, begin to swell and are then ready to be passed into a roasting apparatus. Under the action of the heat, the water absorbed by the earth-nut kernels is then converted into steam. This steam, which forms inside the kernels, dilates them and inflates the cells, thus finally restoring the kernels to their initial shape.

(The results obtained by soaking the kernels, even very rapidly, in water are altogether bad in comparison with those obtained by subjecting the kernels to the action of steam.)

The passage in the roasting apparatus may be made more or less long:

(a) One may simply heat so as to restore to the kernels their original shape and volume; there is thus obtained an earth-nut kernel which remains white (kind of haricot bean for food);

(b) Or else one may heat further and longer so as to obtain a more or less grilled kernel; there is then formed a certain quantity of dextrin and the grilled kernel has a more or less sweet taste.

There is obtained in the end a kernel which has lost a large part of its oil (the proportion of oil extracted being a function of the pressure given and the duration of this pressing) extremely rich in nitrogenous substances (up to 50 per cent approximately) and in amylaceous substances and relatively poor in oil (the quantity of oil contained depending on the variety of earth-nut kernel treated, the value and the duration of the pressing).

The more or less roasted product obtained according to the process has a much sweeter taste than the earth-nut kernal grilled in the shell (pea-nuts of commerce).

The product thus obtained is similar in appearance and shape to the natural earth-nut kernels freed from their rose-coloured films, but it contains a much less quantity of oil than these kernels and its density is much lower.

The product lends itself perfectly well to human nourishment (in particular to the feeding of natives of hot countries under-nourished in nitrogen) and to certain special uses (confectionery, biscuits, pastry, etc.). It can replace with advantage in current consumption the grilled pea-nuts of commerce.

It should be well understood that I do not wish to be limited to the specific example above described as there might be changes made thereto without departing from the principle of my invention as comprehended within the scope of the appended claims.

What I claim is:

1. The process of treating earth-nut kernels which comprises, decorticating the kernels so as to keep them, as far as possible, intact and with their rose-coloured skins, heating these kernels, then pressing these kernels without crushing them, collecting the oil thus obtained, disintegrating the cake obtained after pressing, which consists of kernels flattened but not crushed, humidifying, and heating said kernels in order to restore them to their initial shape.

2. The process of treating earth-nut kernels which comprises, decorticating the kernels so as to keep them, as far as possible, intact and with their rose-coloured skins, heating said kernels, subjecting them to a desiccating treatment in order to reduce their percentage of water to a low value, pressing these kernels without crushing them, collecting the oil thus obtained, disintegrating the cake obtained after pressing, which cake consists of kernels flattened but not crushed, humidifying said kernels and heating them, in order to restore them to their initial shape.

3. The process of treating earth-nut kernels which comprises, decorticating the kernels so as to keep them, as far as possible, intact and with their rose-coloured skins, heating said kernels at a temperature of about 80–90° C., subjecting them to a desiccating treatment in order to reduce their percentage of water to a low value, pressing these kernels without crushing them, collecting the oil thus obtained, disintegrating the cake obtained after pressing, which consists of kernels flattened but not crushed, humidifying said kernels, and heating them in order to restore them to their initial shape.

4. The process of treating earth-nut kernels which comprises decorticating the kernels so as to keep them, as far as possible, intact and with their rose-coloured skins, heating said kernels to a temperature of about 80–90° C., subjecting them to a desiccating treatment so as to reduce their percentage of water preferably to from 4 to 1 percent, pressing these kernels still whole and hot without crushing them, collecting the oil thus obtained, disintegrating the cake obtained after pressing, which consists of kernels flattened but not crushed, subjecting said kernels to the action of steam, and then heating them in order to restore them to their initial shape.

5. A process according to claim 4 in which the final heating of the flattened and then humidified kernels is such as to merely restore the kernels to their initial volume and shape.

6. A process according to claim 4 in which the final heating of the flattened and then humidified kernels is carried out in such manner as to grill the kernels.

PAUL AMMANN.